UNITED STATES PATENT OFFICE.

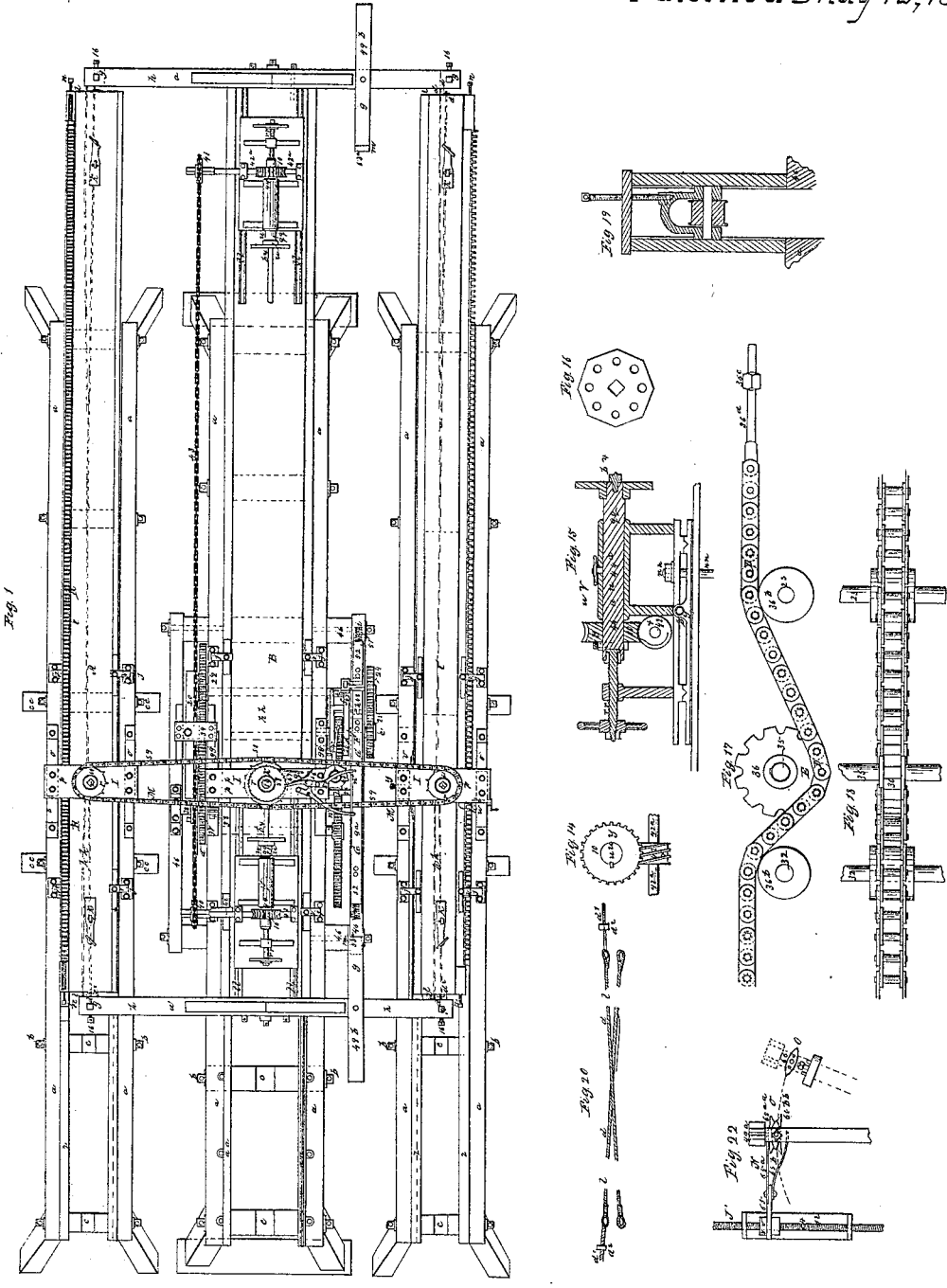

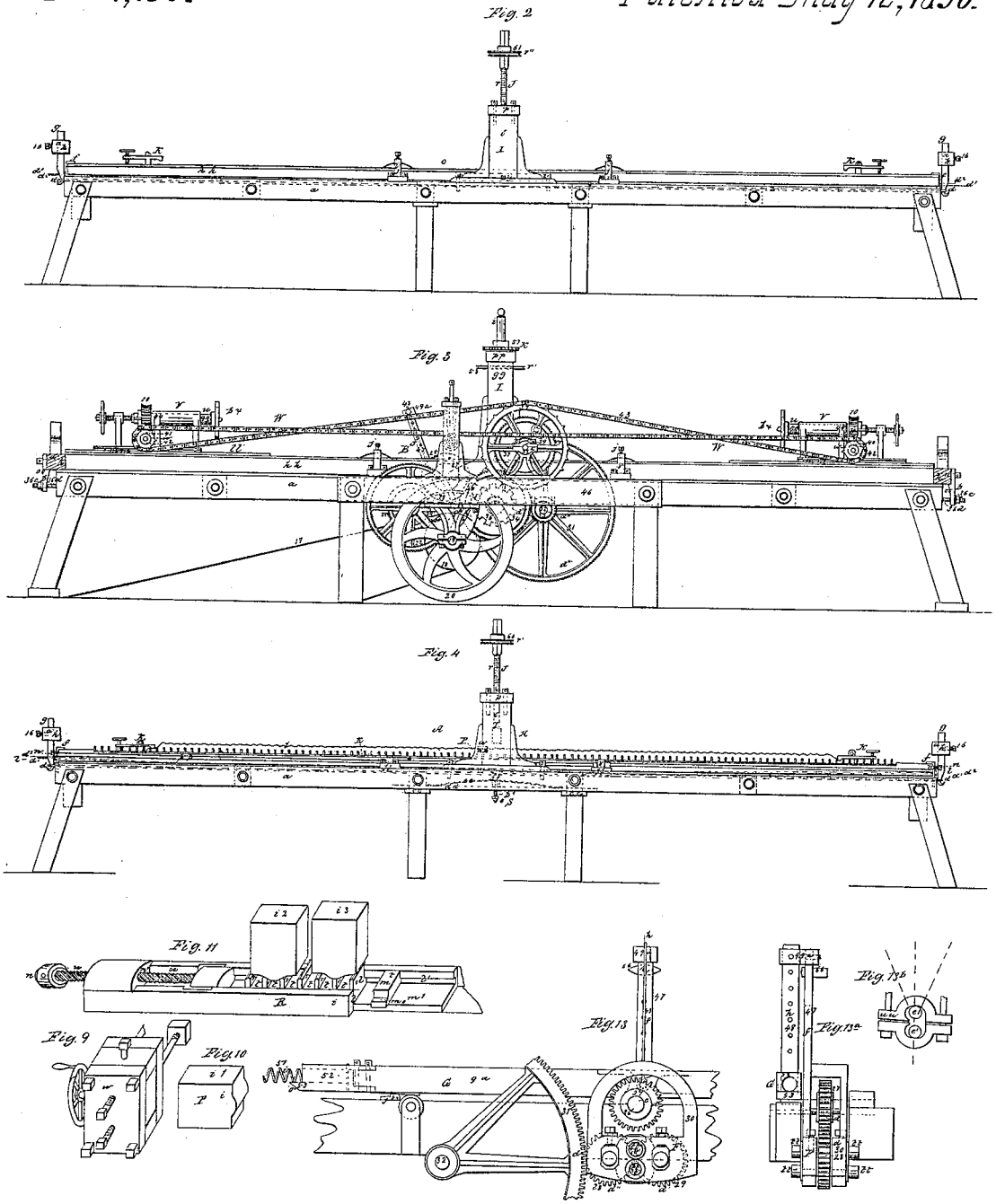

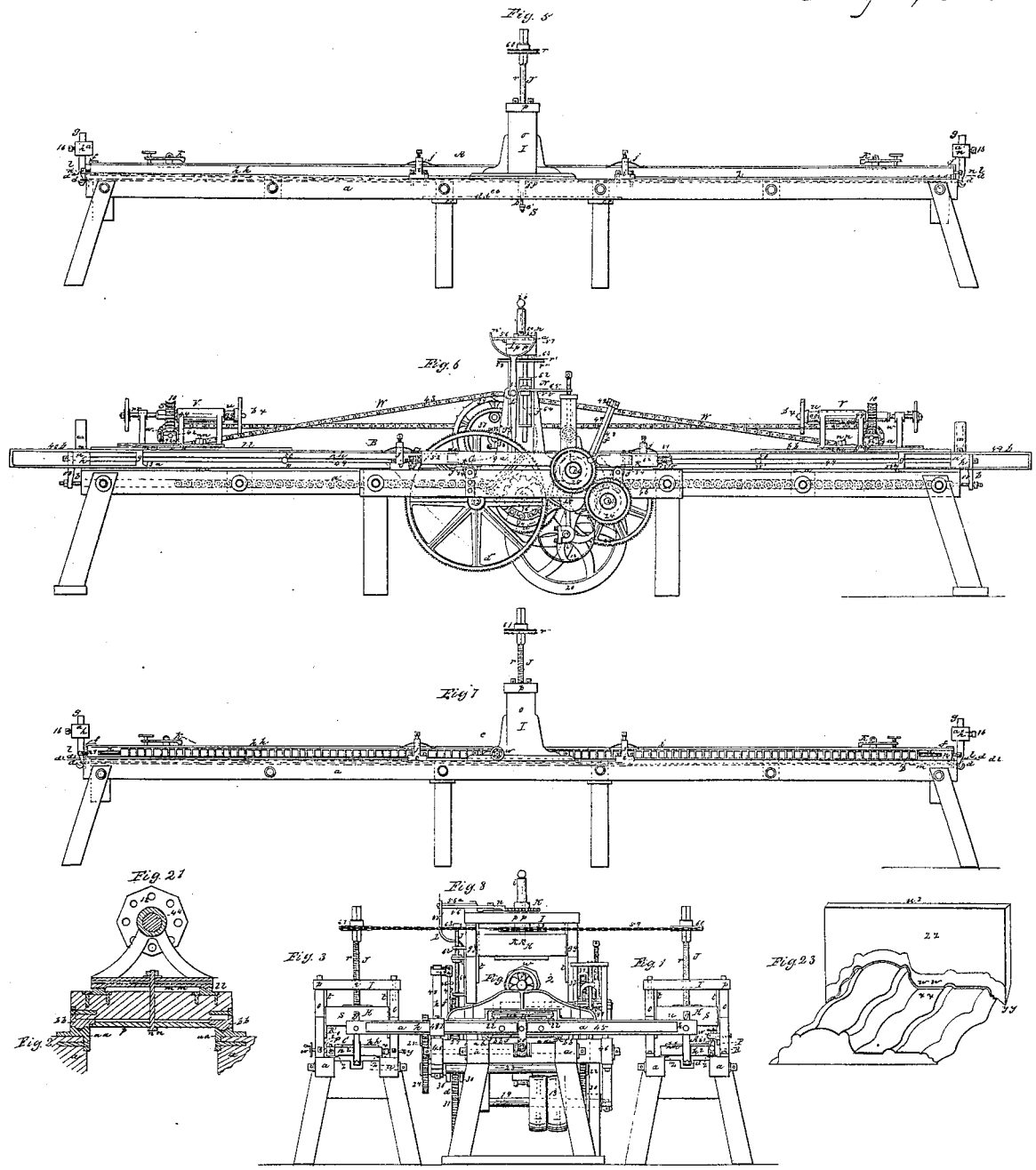

JOHN T. BRUEN, OF NEW YORK, N. Y.

CUTTING FIGURES IN RELIEF ON WOOD.

Specification of Letters Patent No. 7,156, dated March 12, 1850.

*To all whom it may concern:*

Be it known that I, JOHN THEOPHILUS BRUEN, of the city, county, and State of New York, have invented certain new and useful Improvements in Machines for Carving Wood and other Materials; and I do hereby declare that the following is a full, clear, and exact description of my invention, reference being had to the accompanying drawings, which form part of this specification and represent a machine with three carriages constructed to carve wood on the principle invented by me, Figure 1 being a ground plan of the machine; Figs. 2, 3, and 4, elevations of the front sides of the three separate carriage frames A, B, and C of Fig. 1; Figs. 5, 6, and 7, elevations of the back sides of the same; Fig. 8, an end view of the machine, and Figs. 9 to 23 being views of separate detached portions thereof.

The letters on the drawings referred to in this specification are those in red ink.

The reduction of the wood in this machine is effected by a cutter or cutters against which the material to be carved is forced by securing it to a reciprocating carriage, the outline of the edge of the cutter being the counterpart of the transverse section of the figure to be produced; and my invention consists in producing on the surface of the wood or other material figures having a curvilinear, zigzag, or mixed outline by giving to the material a transverse in combination with a longitudinal motion while in contact with the scraping or cutting tool or by giving these movements to the cutter, the material remaining stationary; or by giving a part of these movements to the material, and part to the cutter so that the resultant motion shall produce the same effect; the transverse movements required to produce these forms being effected by means of an adjustable guide rack and guide block operating substantially as herein described. The material may remain at rest on the moving carriage or it may be caused to turn upon its axis while the carriage is moving, thus producing an object carved upon either one or all its sides. The carriage may also be moved transversely in but one direction to its longitudinal motion or it may be moved in two or more according to the greater or less intricacy of the figure to be produced.

In the machine represented in the accompanying drawings the material alone is moved while the cutters remain stationary. It is constructed with three carriages A, B, C, parallel to each other, and which are each supported on a strong frame or bench. They are all put in motion by the rotative machinery mounted upon the central carriage frame, the motion of the central one being communicated to the side ones by means of two yokes $a$, $a'$, one of which is secured to each extremity of the central carriage. A reciprocating motion is communicated to the central carriage by means of a chain D, the extremities of which are secured to arms $b$, depending from the extremities of the carriage and which is acted upon by a toothed wheel E on a shaft $c$ to which a reciprocating rotary motion is imparted from a continuously revolving shaft $c'$, by means of cog wheels $d$, $d'$, $d''$, $d'''$, $d''''$, $d'''''$, which are so arranged that the motion is alternately transmitted through an equal and an unequal number of wheels the change from the one to the other being effected by throwing either one or the other of the wheels $d'$, $d''$, which are always in gear with each other into gear with the wheel $d$. When the wheel $d'$ is in gear the motion is transmitted through the six wheels, $d$, $d'$, $d''$, $d'''$, $d''''$, $d'''''$, and when the wheel $d''$, is in gear with $d$ through the five wheels $d$, $d''$, $d'''$, $d''''$, $d'''''$. The throwing of one or other of the wheels into gear is effected by suspending the boxes of their spindles in a vibrating frame F (see Figs. 13, 13$^a$ and 13$^b$) turning alternately upon two centers $e$ $e'$, to which a shifting lever $f$, is secured, the latter is operated by the motion of the central carriage in the following manner: Two adjustable stops $g$, $g$, are secured to the carriage which act alternately upon the opposite ends of a sliding bar G, the latter being connected with the shifting lever by means of a spring bar $h$, which prevents the jar that would take place if the connection was rigid. The sliding bar is hinged at its center to allow either of its extremities to rise without affecting the other. Each of its ends is fitted with a spring $i$, $i$, sufficiently powerful when compressed to move the sliding bar and change the position of the shifting lever, the lower face of each extremity of the bar is furnished with a detent $k$, (Figs. 6 and 13) which falling against a snug $j$, projected from the frame of the machine locks the sliding bar, and through it the shifting lever, in its position. The lower angle of each end of the bar is beveled off at (o, o,) and an inclined projection m, is attached to the lower part of each of the stops g, on the carriage. As the carriage is moved forward by the action of the chain D the face of the adjustable stop g first strikes the projecting extremity of the spring, and as the sliding bar is held in its position by the detent, the spring is compressed by the approaching stop until the inclined projection m, coming in contact with the beveled end o of the sliding bar, lifts that extremity of the bar sufficiently to detach the detent k from the snug j, and thus unlock the bar, when the tensive force of the compressed spring acting on the bar and moving it endwise reverses the position of the shifting lever f and thus changing the position of the wheels $d'$ $d''$ reverses the motion of the shaft by which the chain D, is driven, and consequently the motion of the carriage. As soon as the carriage arrives at the opposite extremity of its track the other stop comes into play and the shifting lever is changed back to its first position. The stops being adjustable can be secured at any desired distance from the extremities of the carriage, and hence its motion can be reversed at any point of its track.

The side carriages in this machine are driven from the center one by means of the yokes $a$ $a'$ secured to each extremity of the central carriage but as for reasons hereafter mentioned these carriages must be free to move, the one in a vertical and the other in a horizontal direction, their extremities are not connected directly with the yokes adjoining them but the one extremity of the carriage is connected with the yoke adjoining its opposite extremity by a rope $l$ (see Figs. 1 to 8 and Fig. 20) extending its whole length; this method of connection allowing the carriage to move at right angles to its longitudinal motion with all the freedom neccessary.

The cutters a perspective view of one of which is represented at Fig. 23 are constructed in the usual manner of cutting instruments for similar purposes; they are secured to a bar or gate H sliding vertically in guides attached to a stationary cutter frame I mounted upon each carriage frame. Each gate is raised or lowered by means of a screw J which passes through a nut secured in the cross bar of the cutter frame. The central screw is turned by the reciprocating carriage in the following manner: A ratchet wheel K is secured to the stem of the screw which is turned by a finger lever, n, pivoted to the top of the cutter frame the outer extremity of the lever projects over the frame and is operated by one prong of the forked extremity of a lever L pivoted to the side of the cutter frame; an adjustable stop or pin p (see Fig. 6) is secured to the carriage which strikes the lower extreme of the forked lever and thus moving the finger lever, n, turns the ratchet wheel; as the stop receeds from the forked lever by the reversal of the motion of the carriage the finger lever is returned to its position by a spring $q$; and as it is necessary in order to expedite the carving, that the cutter should act when the carriage is moving in both directions, a second lever, $n'$, is pivoted to the top of the cutter frame which is operated by the other prong of the forked lever, L, when the lower extremity of the latter is struck by a second stop pin, $p'$, on the other extremity of the carriage. The second lever $n'$ is arranged to act upon the finger lever $n$ and through it upon the ratchet wheel, so that the screw is turned to depress the cutter whenever the motion of the carriage is reversed. The screws of the side cutters are operated from that of the central one by means of an endless chain M which encircles toothed wheels $r$, $r'$, $r''$, secured to the stems of all three screws, so that when the central one is turned the side ones are turned in a corresponding manner.

In order that the machine may stop itself when the cutters have been sufficiently depressed to produce the intended figure, a screw, $J'$, is added to the side of the central cutter frame which raises or depresses an adjustable sliding arm, N, furnished with spring nippers (see Fig. 22) projecting sufficiently from the cutter frame to obstruct the motion of the shifting lever, the stem of the screw is fitted with a toothed wheel $r'''$, which is operated by the endless chain. When the machine is acting this arm is above the upper extremity of the shifting lever, as the cutters are progressively depressed it being operated by the endless chain is correspondingly depressed until when the cutters are at their lowest positions, the spring nippers are sufficiently low to receive between their jaws a block O, secured to the shifting lever and thus retain the latter midway in its passage. As the machine is constructed in such manner that when the lever is in this position neither of the wheels $d'$, $d''$, are in gear with the wheel $d$ on the continuously revolving shaft $c$ it follows that the cutting will be immediately stopped.

In the machine thus far described the carriage A is constructed to move vertically at right angles with its longitudinal motion in the manner invented by me. This vertical motion is effected by means of a guide block P (Fig. 4) secured to the carriage. The guide block (one of which is represented at Figs. 10 and 11) is secured in a socket (Fig. 9) in which it is adjusted by screws in any desired position, the rack R (more fully shown in Fig. 11) is composed of teeth $s$, separated by blocks $f$, the whole secured in a trough by means of a clamp screw $u$, in such manner that they may be removed and arranged in different order or may be replaced by others of different dimensions to vary the form of the figure to be produced; the teeth and blocks may be placed at different distances from each other by the use of space blocks $t$ of different dimensions, or by removing one or more teeth. In order to secure the blocks and teeth firmly to the trough the latter is constructed with one or more longitudinal grooves or rabbets, and tongues are projected from the teeth and blocks which fit into the grooves.

The carriage A does not slide directly upon its bench but is supported on springs S, whose tension can be adjusted by screws. These springs force the carriage upward and thus press the rack against the guide block, as the carriage is moved longitudinally each rack tooth passing beneath the guide block is depressed, thus compressing the springs and depressing the carriage to the face of which the material is secured; as the distance between the face of the carriage and the edge of the cutter is thus increased a greater thickness of material is left at these points, thus producing a projection in the carved figure. As the tooth passes on, the springs acting upon the bottom of the carriage cause it to rise and the pattern block is received in the space between the rack teeth, as by this movement the face of the carriage is brought nearer to the edge of the cutter, a greater portion of the material is removed and depressions are formed. Thus by the action of the guide block alternately upon the teeth and spaces of the rack, a figure of a mixed curvilinear (as represented in red lines in Fig. 4) or zigzag outline is produced the transverse sections of which are the counterparts of the cutter. In order to steady the carriage, guide blocks $v$, $v$, are attached to the frame on which it moves, and springs are attached to the blocks which press upon the moving carriage and thus prevent the vibrations that would otherwise take place.

The carriage C is constructed in every respect like the carriage A with the exception that the guide rack R' is secured to its edge and the guide block P' is projected horizontally from the cutter frame, thus forcing the carriage to move horizontally instead of vertically; this change in the position of the rack requires a corresponding change in the position of the springs S which must always act in opposition to the guide block and must therefore in this instance act against the edge of the carriage instead of its bottom as in the former case, the steadying springs and guide blocks $v$, must also be aranged to allow the horizontal movement to take place. Materials secured to this carriage will thus receive a curvilinear, zigzag or mixed outline, but the undulations will be horizontal instead of vertical as in the former case.

When a composite carved figure is required or one in which the figures have both vertically and horizontally a curvilinear, zigzag, or mixed outline, is required, the two guide racks and blocks just described must be attached to the same carriage the one to its face, the other to its edge, so that while it slides along longitudinally it will at the same time receive the requisite double transverse movement.

I have thus far described the tool as remaining stationary during its action upon the material and the carriage as being moved by the action of the guide block and rack in a transverse direction to its longitudinal motion; but it is obvious that the same effect will be produced by constructing the carriage with the racks to move in a longitudinal direction alone, and arranging the cutter to move in a transverse direction to this longitudinal motion; the moving of the cutter would in this case be effected by the guide blocks which being pressed against the racks by springs would be alternately forced outward from the carriage by the teeth of the guide racks and sink again into the spaces between them.

When round objects such for example as bed posts, stair-balusters, &c., are to be carved the material may be supported by two mandrels U, U, arranged in puppet heads V, V, as represented on the central carriage in the accompanying drawings (and on a larger scale in Figs. 14, 15, 16, and 21); and a spiral figure may be produced by turning the mandrels, thus turning the object on its axis while the carriage is moved beneath the cutter, the direction in which the mandrels are turned being reversed whenever the longitudinal motion of the carriage is changed. This turning of the mandrels is effected by means of an endless chain W driven by a toothed wheel X to which a rotary motion is imparted from the driving shaft through the intervention of cog wheels. The chain acts at each puppet head upon a wheel $w$ secured to the shaft of an endless screw $x$ which gears into a worm wheel $y$, upon the mandrel of the puppet head.

Having thus described my invention and exemplified the manner in which it may be carried into effect. I wish it to be distinctly understood that I do not confine myself to the precise mechanical devices herein described for holding the material for moving the carriages to and fro, for setting the cutters, or for holding the rack teeth and blocks but intend to vary them as circumstances may render expedient; but

What I claim as my invention and desire to secure by Letters Patent, is—

1. The combination of an adjustable guide rack with an adjustable guide block to produce the transverse in combination with the longitudinal motion for the purpose of producing on wood or other material forms of a curvilinear zigzag or mixed outline, substantially as herein set forth.

2. I likewise claim the device for effecting the reversal of the shifting lever constructed and arranged substantially as herein set forth, and composed essentially of the adjustable stops ($g$), springs ($i$), detents ($k$), vibrating frame (F), and wheels ($d'$ $d''$).

In testimony whereof I have hereunto subscribed my name.

JNO. TH. BRUEN.

Witnesses:
HENRY GUEST,
I. H. LESTER.